United States Patent [19]

Lemersal, Jr. et al.

[11] Patent Number: 5,157,693
[45] Date of Patent: Oct. 20, 1992

[54] DIGITAL MODULATION CIRCUIT

[75] Inventors: Donald B. Lemersal, Jr., Park Ridge; Thomas J. Walczak, Woodstock; Robert J. Greene, Streamwood, all of Ill.

[73] Assignee: Motorola, Inc., Schaumburg, Ill.

[21] Appl. No.: 678,518

[22] Filed: Apr. 1, 1991

[51] Int. Cl.$^5$ .............................................. H04L 27/20
[52] U.S. Cl. ........................................ 375/67; 375/52; 375/54; 375/56; 332/103
[58] Field of Search ....................... 375/52, 54, 56, 67; 332/103, 104

[56] References Cited

U.S. PATENT DOCUMENTS 4,358,853  11/1982  Qureshi ................................ 332/103
4,613,976   9/1986  Sewerinson et al. ................. 375/52
4,672,634   6/1987  Chung et al. ......................... 332/104
4,680,556   7/1987  Nakamura et al. .................. 332/103

Primary Examiner—Curtis Kuntz
Assistant Examiner—Young Tse
Attorney, Agent, or Firm—Robert H. Kelly

[57] ABSTRACT

A modulator circuit for generating a modulated, DQPSK signal. The modulator circuit includes an encoder for receiving a binary bit stream comprised of bit pairs defining differential phase changes. An encoder receives a bit stream of which bit pairs thereof define differential phase changes. The encoder encodes the bit pairs into codewords which are stored and then supplied to an I-accumulator, a Q-accumulator, and a memory element. The memory element contains pre-multiplied values which are supplied to the I- and the Q-accumulators which add terms of the pre-multiplied values to form I-portions and Q-portions of a DQPSK-modulated signal. The I- and Q-portions may then be supplied to a quadrature modulator.

35 Claims, 9 Drawing Sheets

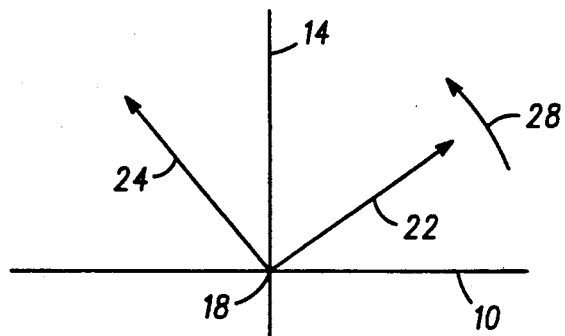
FIG.1
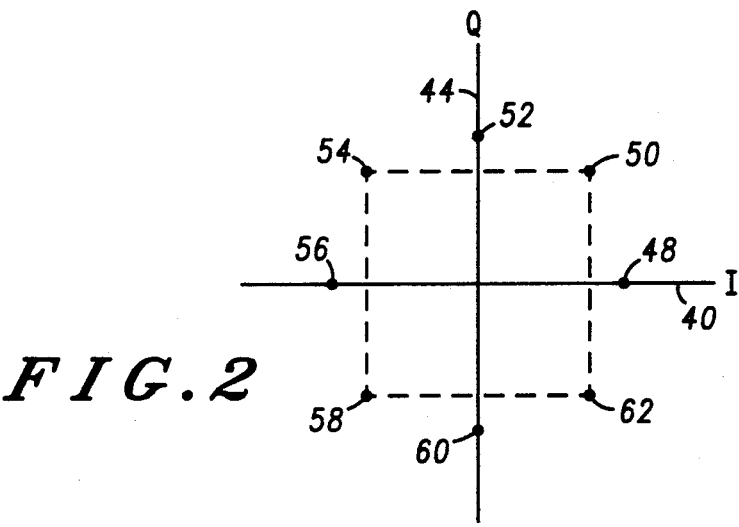
FIG.2
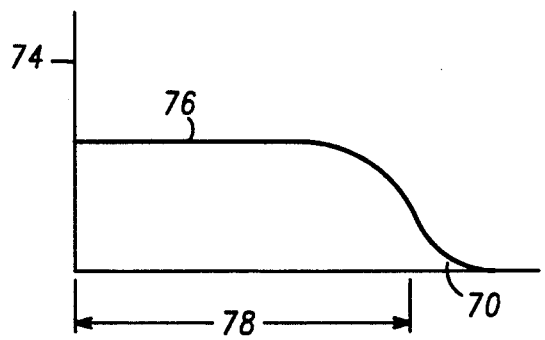
FIG.3A
FIG.3B
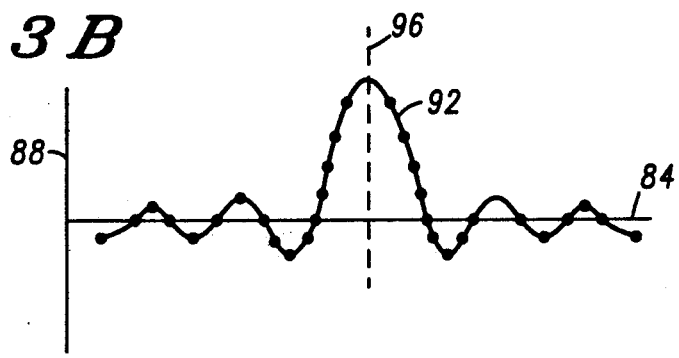

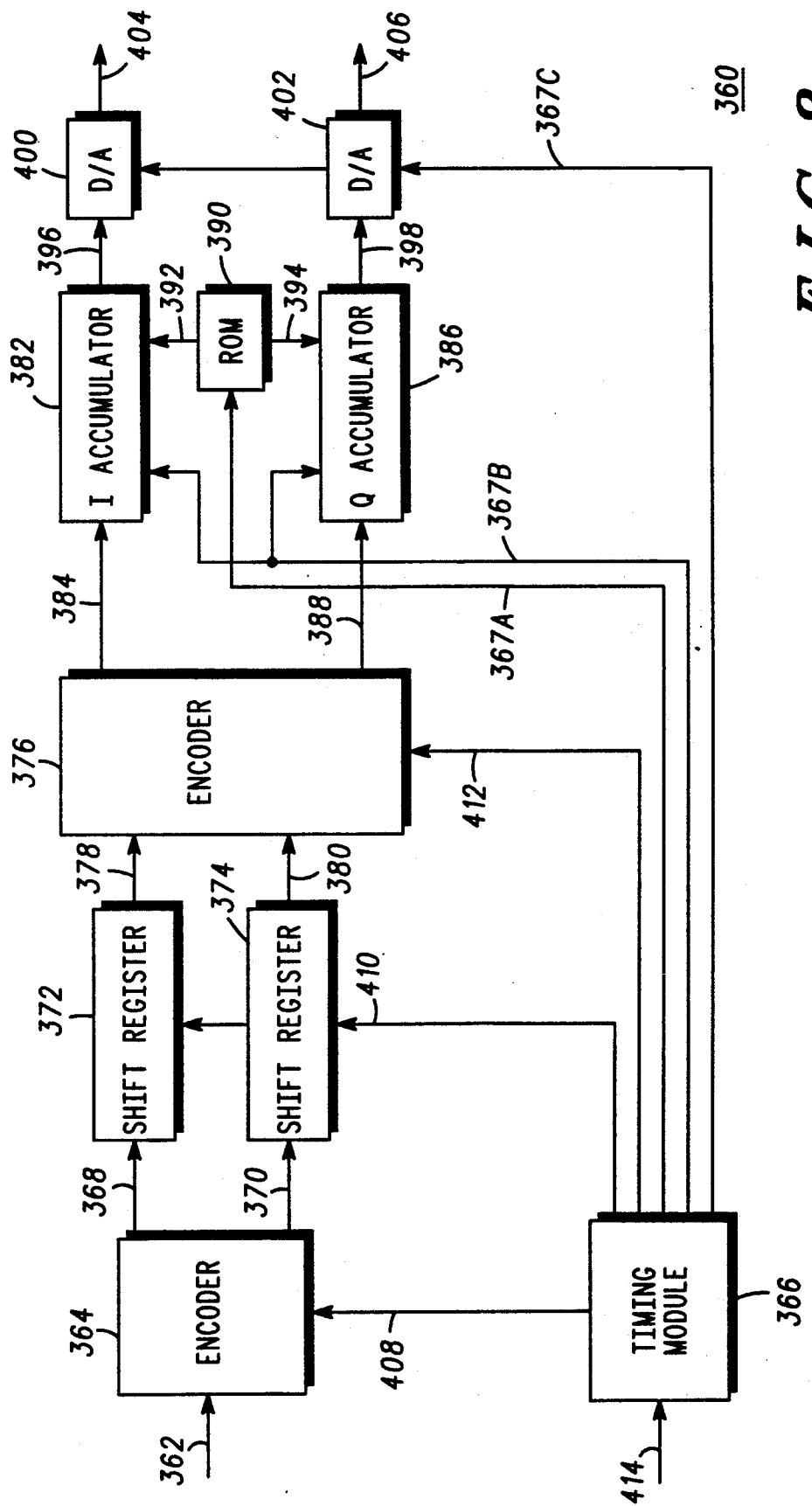

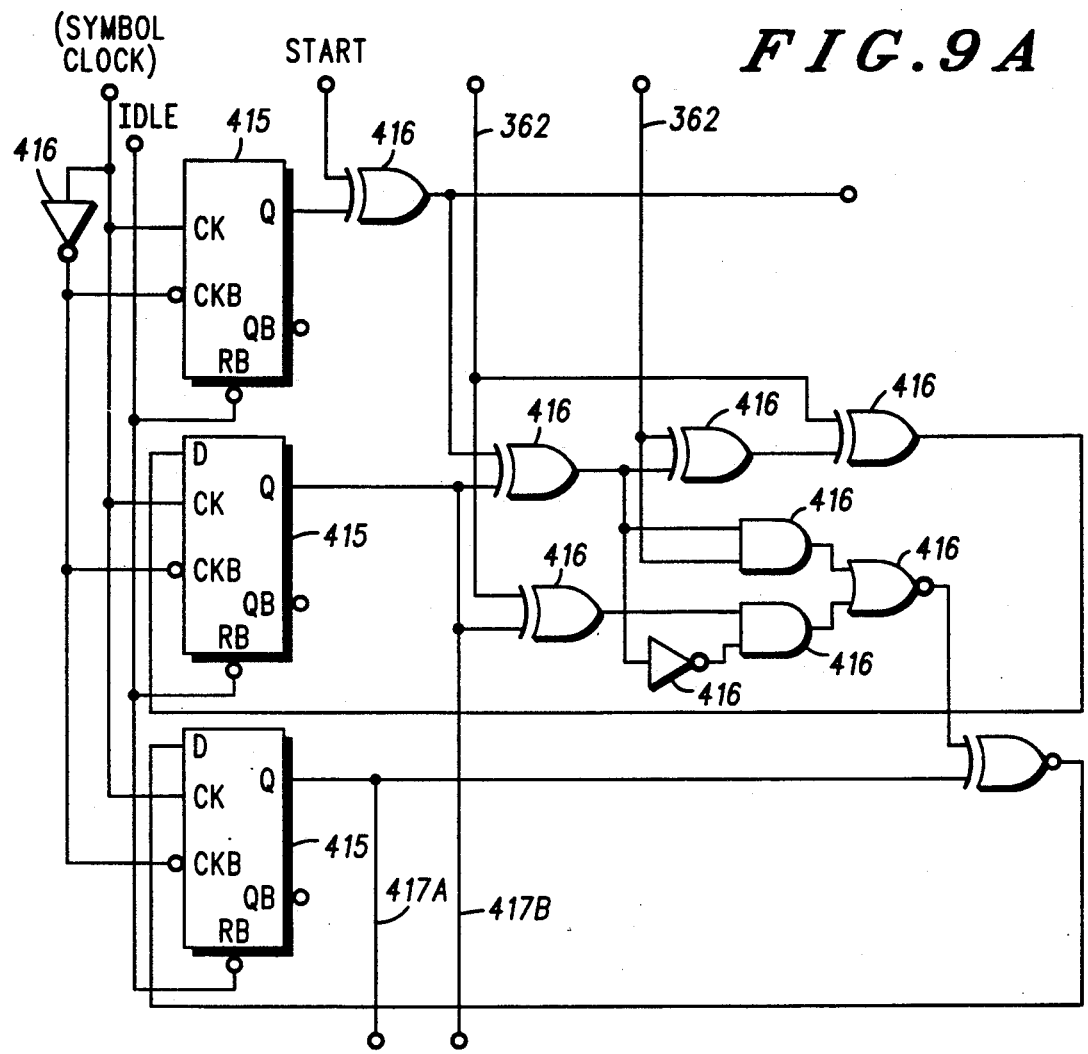
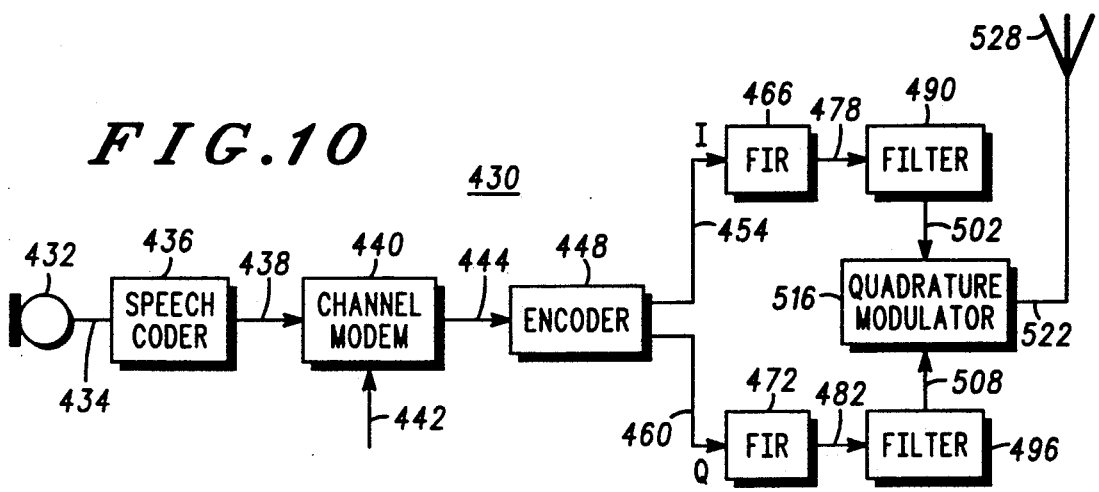

DIGITAL MODULATION CIRCUIT

BACKGROUND OF THE INVENTION

The present invention relates generally to transmitter circuitry, and, more particularly, to a Differential Quadrature Phase Shift Keying (DQPSK) modulation circuit for generating a DQPSK-modulated signal.

A communication system which transmits information between two locations includes, at a minimum, a transmitter and a receiver interconnected by a transmission channel. An information signal (which contains information) is transmitted by the transmitter upon the transmission channel to the receiver which receives the transmitted, information signal.

A radio communication system comprises one type of communication system wherein the transmission channel is formed of a radio-frequency channel. The radio-frequency channel is defined by a range of frequencies of the electromagnetic frequency spectrum. To transmit an information signal upon the radio-frequency channel, the information signal must be converted into a form suitable for transmission thereof upon the radio-frequency channel.

Conversion of the information signal into the form suitable for transmission thereof upon the radio-frequency channel is accomplished by a process referred to as modulation wherein the information signal is impressed upon a radio-frequency electromagnetic wave. The radio-frequency electromagnetic wave is of a frequency of a value within the range of values of frequencies which defines the radio-frequency channel. The radio-frequency electromagnetic wave upon which the information signal is impressed is commonly referred to as a "carrier signal", and the radio-frequency electromagnetic wave, once modulated by the information signal, is referred to as a modulated, information signal, or, more simply, a modulated signal.

The information content of the resultant modulated signal occupies a range of frequencies, sometimes referred to as the modulation spectrum, centered at, or close to, the frequency of the carrier signal. Because the modulated signal may be transmitted through free space upon the radio-frequency channel to transmit thereby the information signal between the transmitter and the receiver of the communication system, the transmitter and the receiver need not be positioned in close proximity with one another. As a result, radio communication systems are widely utilized to effectuate communication between a transmitter and a remotely-positioned receiver.

Various modulation techniques have been developed to modulate the information signal upon the carrier signal to form the modulated signal, thereby to permit the transmission of the information signal between the transmitter and the receiver of the radio communication system. Such modulation techniques include, for example, amplitude modulation (AM), frequency modulation (FM), phase modulation (PM), frequency-shift keying modulation (FSK), phase-shift keying modulation (PSK), and continuous phase modulation (CPM). One type of continuous phase modulation is quadrature amplitude modulation (QAM). To be discussed more fully hereinbelow is a particular QAM modulation technique, namely, a differential quadrature phase shift keying (DQPSK) modulation technique.

The receiver of the radio communication system which receives the modulated signal contains circuitry to detect, or to recreate otherwise, the information signal modulated upon the carrier signal. Typically, the circuitry of the receiver includes circuitry (sometimes consisting of several stages) to convert downward in frequency the modulated signal received by the receiver in addition to the circuitry required to detect, or to recreate otherwise, the information signal. The process of detecting or recreating the information signal from the modulated signal is referred to as demodulation, and such circuitry for performing the demodulation is referred to as demodulation circuitry. The circuitry of the receiver is constructed to detect, and to demodulate modulated signals which have been modulated by one of the modulation techniques above-mentioned.

In many instances, a plurality of modulated signals may be simultaneously transmitted as long as the simultaneously-transmitted, modulated signals are formed of carrier signals of dissimilar frequencies, and the resultant, modulated signals do not overlap in frequency. More particularly, the frequencies of the carrier signals of the simultaneously-transmitted, modulated signals must be separated, in frequency, to prevent the information content of the resultant, modulated signals (i.e., the modulation spectrum of the modulated signals) from overlapping with simultaneously-transmitted, modulated signals modulated upon carrier signals of other frequencies.

The broad range of frequencies of which the carrier signal may be comprised, and upon which the information signal may be modulated, is referred to as the electromagnetic frequency spectrum. Regulatory bodies have divided portions of the electromagnetic frequency spectrum into frequency bands, and have regulated transmission of modulated signals upon various ones of the frequency bands. The frequency bands have been further divided into channels, and such channels form the radio-frequency channels of a radio communication system. Regulation of the transmission of modulated signals within the various ones of the frequency bands, and, more particularly, upon the channels into which the frequency bands have been divided, minimizes interference between simultaneously-transmitted, modulated signals.

For instance, portions of a one hundred MHz frequency band extending between eight hundred MHz and nine hundred MHz are allocated in the United States for radiotelephone communication. Such radiotelephone communication includes radiotelephone communication in a cellular, communication system. Conventionally, a radiotelephone contains circuitry to permit simultaneous generation and reception of modulated signals, to permit thereby two-way communication between the radiotelephone and a remotely-located transceiver.

A cellular, communication system is formed by positioning numerous base stations at spaced-apart locations throughout a geographical area. Each base station contains circuitry to receive modulated signals transmitted by one, or many, radiotelephones, and to transmit modulated signals to the one, or many, radiotelephones.

The positioning of each of the base stations forming the cellular, communication system is carefully selected to ensure that at least one base station is positioned to receive a modulated signal transmitted by a radiotelephone positioned at any location throughout the geographical area. That is to say, at least one base station must be within the transmission range of a radiotelephone positioned at any such location throughout the geographical area. (Because the maximum signal strength, and hence, maximum transmission range, of a signal transmitted by a base station is typically greater than the maximum signal strength, and corresponding maximum transmission range, of a signal generated by a radiotelephone, the maximum transmission range of a signal generated by a radiotelephone is the primary factor which must be considered when positioning the base stations of the cellular, communication system.)

Because of the spaced-apart nature of the positioning of the base stations, portions of the geographical area throughout which the base stations are located are associated with individual ones of the base stations. Portions of the geographical area proximate to each of the spaced-apart base stations define "cells" wherein a plurality of cells (each associated with a base station) together form the geographical area encompassed by the cellular, communication system. A radiotelephone positioned within the boundaries of any of the cells of the cellular, communication system may transmit, and receive, modulated signals to, and from, at least one base station.

Increased usage of cellular, communication systems has resulted, in many instances, in the full utilization of every available transmission channel of the frequency band allocated for cellular, radiotelephone communication. As a result, various ideas have been proposed to utilize more efficiently the frequency band allocated for radiotelephone communications. By more efficiently utilizing the frequency band allocated for radiotelephone communication, the transmission capacity of an existing cellular, communication system may be increased.

The transmission capacity of the cellular, communication system may be increased by minimizing the modulation spectrum of the modulated signal transmitted by a transmitter to permit thereby a greater number of modulated signals to be transmitted simultaneously. Additionally, by minimizing the amount of time required to transmit a modulated signal, a greater number of modulated signals may be sequentially transmitted.

By converting an information signal into discrete form prior to modulation thereof, and then modulating the discrete, information signal, the resultant, modulated signal is typically of a smaller modulation spectrum than a corresponding modulated signal comprised of an information signal that has not been converted into discrete form. Additionally, when the information signal is converted into discrete form prior to modulation thereof, the resultant, modulated signal may be transmitted in short bursts, and more than one modulated signal may be transmitted sequentially upon a single transmission channel.

Converting the information into discrete form is typically effectuated by an encoding technique, and apparatus which effectuates such conversion is typically referred to as an encoder. An encoded signal generated as a result of an encoding technique may, for example, be in the form of a discrete binary data stream. The elements (i.e., bits) of the discrete binary data stream represent various characteristics of the information signal. The binary data stream comprising the encoded signal may be appropriately filtered, and modulated by a modulation technique, as noted hereinabove, to form a modulated signal of a frequency appropriate for transmission upon a desired transmission channel.

When an information signal is comprised of a voice signal (i.e., a speech waveform), an encoding technique not only converts the speech waveform into discrete form, but, additionally, in so doing, removes some of the significant redundancy of the speech waveform. Because the binary data stream into which the speech waveform is converted is representative of a speech waveform with some of the redundancy removed, the bandwidth of a resultant, modulated signal formed therefrom is less than the bandwidth of a corresponding, modulated signal formed of a non-encoded speech waveform. The smaller bandwidth of the resultant, modulated signal permits either more transmission channels to be defined over a frequency band of the same bandwidth; intermittent use of the transmission channel is additionally permitted rather than continuous use which is required for transmission of a modulated signal comprised of an information signal in which a non-encoded speech waveform comprises the information signal. More than one information signal may, hence, be transmitted upon a transmission channel; the transmission capacity of the existing frequency band allocated for radiotelephone communications may be increased by a multiple of two or more.

Encoding of an information signal into a discrete binary data stream is also advantageous as noise introduced upon the modulated signal during transmission upon the transmission channel may be more easily detected and removed when the information signal is comprised a discrete binary data stream than when the information signal is comprised of a conventional, analog signal.

Still further efficiency may be achieved by advantageous selection of the modulation technique utilized to modulate the information signal to form the modulated signal thereby. Traditionally, frequency modulation is the modulation technique utilized to form the modulated signal transmitted by or to a radiotelephone of a cellular, communication system. A modulated signal generated as a result of a frequency modulation technique passes information only by changing the phase of the carrier signal. Conversely, when the modulated signal is generated as a result of a continuous phase modulation technique, information is passed by changing both the amplitude and by changing the phase of the carrier signal.

Therefore, a radio communication system capable of generating and receiving modulated signals formed by a continuous phase modulation technique may more efficiently utilize the frequency band allocated therefor.

As mentioned hereinabove, one type of continuous phase modulation includes quadrature amplitude modulation (QAM). A binary data stream comprising the information signal may be advantageously modulated to form a baseband, QAM-modulated signal according to this modulation technique. The binary data stream is separated into bit pairs. The data stream is then passed through a pair of electric wave filters, and applied to a multiplier pair having second inputs comprised of sine and cosine components of a carrier or carrier intermediate frequency signal. One particular QAM modulation technique is a $\pi/4$-shift DQPSK (for differential quadrature phase shift keying) modulation technique. In a $\pi/4$-shift DQPSK modulation technique, an input data stream is encoded so that the composite modulated carrier phase shifts in increments of plus or minus of $\pi/4$ radians or plus or minus $3\pi/4$ radians according to values of the individual bit pairs.

Once the baseband, QAM-modulated signal is formed, the modulated signal must be converted in frequency to a radio frequency. In conventional practice, for instance, transmitter apparatus capable of generating a QAM signal, includes circuitry which separates a carrier signal into sine and cosine components, mixes the sine and the cosine components, respectively, with separate portions of the baseband signal, and then sums output signals generated by the respective mixers. The resultant, modulated signal, if at carrier frequency, may be applied to an amplifier to amplify the signal to a desired power level prior to transmission thereof. If the resultant, modulated signal is at a carrier intermediate frequency, a LO oscillating signal is further mixed with the resultant, modulated signal to shift the resultant, modulated signal in frequency to a proper carrier frequency, and then amplified.

Conventionally, circuitry forming a finite impulse response (FIR) filter is utilized to form a filtered, DQPSK-modulated signal. Such circuitry, however, requires repeated multiplicative functions to be performed to form the filtered, DQPSK-modulated signal. Such circuitry, therefore, is complex and costly, and/or requires significant computational time periods to form the filtered, DQPSK-modulated signal.

What is needed therefore, is simplified means for generating a filtered, DQPSK-modulated signal.

SUMMARY OF THE INVENTION

The present invention, accordingly, advantageously provides simplified means for generating a DQPSK-modulated signal.

The present invention further advantageously provides circuitry for generating a DQPSK signal responsive to application thereto of an input signal representative of differential signal phase changes.

The present invention still further advantageously provides a DQPSK transmitter.

The present invention yet further advantageously provides a method for generating a DQPSK-modulated signal.

In accordance with the present invention, therefore, a modulator circuit for generating a modulated, DQPSK signal responsive to application of an input signal representative of differential signals phase changes is disclosed. The modulator circuit converts the input signal representative of the differential signal phase changes into a signal formed of an I-component portion and a Q-component portion. Sequences of the I-component portions and Q-component portions are stored. Weighted values of the stored sequences of the I-component portions and the Q-component portions, are summed to form summed, weighted values therefrom. Signals indicative of the summed, weighted values are formed, and the signals are up-converted to a transmission frequency to form a modulated, DQPSK signal thereby.

BRIEF DESCRIPTION OF THE DRAWINGS

The present invention will be better understood when read in light of the accompany drawings in which:

FIG. 1 is a graphical representation of an axis system utilized to describe an electromagnetic signal according to a preferred embodiment of the present invention;

FIG. 2 is a graphical representation of a discrete encoding scheme utilized according to a preferred embodiment of the present invention;

FIG. 3A is a graphical representation of a filter response, graphed as a function of frequency, of a low pass filter;

FIG. 3B is a graphical representation, similar to that of FIG. 3A, but wherein the filter impulse response is graphed as a function of time;

FIG. 8 is a functional block diagram of a DQPSK modulator circuit constructed according to an alternate, preferred embodiment of the present invention;

FIGS. 9A and 9B are circuit diagrams of preferred implementations of the encoders forming portions of the DQPSK modulator of FIG. 8;

FIG. 10 is a functional block diagram of a DQPSK transmitter of a preferred embodiment of the present invention of which the DQPSK modulator circuit of FIG. 5 comprises a portion thereof;

DESCRIPTION OF THE PREFERRED EMBODIMENTS

Figure 4:
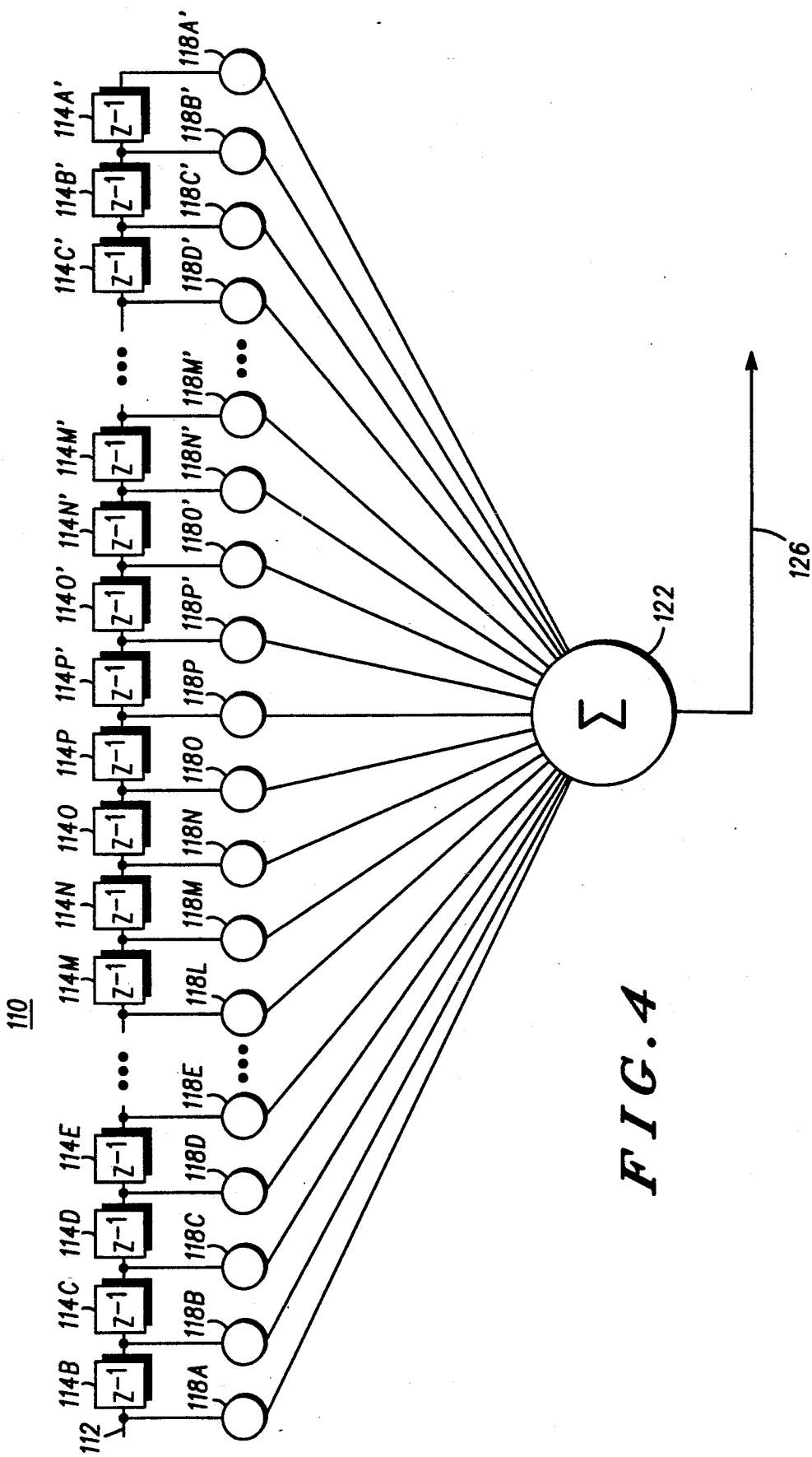
FIG. 4 is a functional block diagram of a thirty-two tap, finite impulse response filter of a preferred embodiment of the present invention.

An electromagnetic wave may be described mathematically by a combination of a scaled, sine wave, and a scaled, cosine wave according to the following equation:

$$s(t) = I(t) \cos(\omega t) + Q(t) \sin(\omega t)$$

where:

I(t) and Q(t) are time-varying functions which are referred to as "in-phase" and "quadrature-phase" components of a signal, respectively;

$\omega$ is the angular frequency of a carrier signal or $2\pi f$, where f is the cyclic frequency of the carrier signal; and t is time (in seconds).

This equation may be graphically represented by plotting the resultant sum, s(t), as a function of time; alternately, the equation may be graphically represented on the axis system illustrated in FIG. 1.

With reference to FIG. 1, therefore, abscissa axis 10 is scaled in terms of cos ($\omega$t), the cosine component of the waveform, and the ordinate axis 14 is scaled in terms of sin ($\omega$t), the sine component of the waveform. Abscissa axis 10 and ordinate axis 14 intersect at origin 18. Because any electromagnetic wave (disregarding harmonics) may be represented by the above equation, any electromagnetic wave may similarly be graphically represented, at any point in time, by a point on the axis system 10-14 wherein the value of I(t) is plotted along axis 10 and the value of Q(t) is plotted along axis 14.

In conventional notation, a vector is formed to interconnect origin 18 of axis system 10-14 and a point defining the electromagnetic wave. Over time, the magnitude and phase of a vector formed thereby, such as vector 22, varies according to the value of the I(t) and Q(t) terms. At a subsequent time, the coordinates of the point defining the electromagnetic wave change, and the vector formed therefrom similarly changes.

A modulated information signal (i.e., the modulated signal) may similarly be represented upon such an axis system. A modulated signal comprised of an information signal converted into discrete form by an encoding technique to form a differentially-encoded signal according to the $\pm \pi/4$ radian and $\pm 3\pi/4$ radian differential encoding scheme described hereinabove may, of course, be represented on such an axis system 10-14.

Such a modulated signal may be represented, at any point in time, by a vector defined by one pair of eight possible pairs of coordinates. Turning now to FIG. 2, an axis system 40-44 which corresponds to axis system 10-14 of FIG. 1 is graphically represented. Similar to axis system 10-14 of FIG. 1, axis system 40-44 is formed of abscissa axis 40 and ordinate axis 44 which intersect at origin 46. The modulated signal may be represented, at any point in time, by vectors defined by points 48, 50, 52, 54, 56, 58, 60, or 62 disposed upon the axis system 40-44. Encoding of an information signal into such possible values corresponds to a $\pi/4$-shifted encoding scheme which forms a constellation of possible vector tip locations.

Turning now to the graphical representation of FIG. 3A, the filter response of a low pass filter, here a square root, raised cosine filter (SRRC) as defined in United States Digital Cellular Specification IS-54, is graphed as a function of frequency wherein abscissa axis 70 is scaled in terms of hertz, and ordinate axis 74 is scaled in terms of magnitude. The pass band 76 of the filter, represented in FIG. 3A by a range of frequencies encompassed by the range of frequencies indicated by line segment 78, such that frequency components of a signal applied to the filter and having values within the range of frequencies defined by the pass band 76 of the filter are passed by the filter, and frequency components of a signal applied to the filter and having values beyond the pass band of the filter are not passed by the filter.

FIG. 3B is a graphical representation of the impulse response function of the filter represented in the graph of FIG. 3A, here graphed as a function of time, wherein abscissa axis 84 is scaled in terms of time, and ordinate axis 88 is scaled in terms of magnitude. The resultant plot forming impulse response 92 is of the shape of a sinc function (i.e., (sin x)/x).

The output of a filter responsive to application of an input signal thereto may be mathematically determined by the convolution of the input signal with the impulse response of the filter, represented by impulse response 92 of FIG. 3B.

Because a modulated signal transmitted upon a radio frequency channel, such as a transmission channel of a cellular, communication system is bandwidth-limited, i.e., the bandwidth of the modulated signal must be smaller than the bandwidth of the transmission channel to prevent overlapping of simultaneously-transmitted, modulated signals upon adjacent transmission channels, a transmitter which transmits such a modulated signal typically includes filter circuitry forming filters having filter responses similar to the filter responses graphically represented in FIGS. 3A-3B, prior to transmission thereof. Because the filter output may be mathematically derived, such a filtered signal generated by the filter circuitry may be determined by an algorithm embodied in processor circuitry. When the input signal comprises a DQPSK-encoded signal, such calculation of a bandwidth-limited, filtered output signal is particularly advantageous.

Significantly, impulse response 92 is symmetric about line 96, shown in hatch in the figure. A plurality of points, here sixteen points spaced at periodic intervals located upon impulse response 92 at a left-hand side of line 96, and sixteen points spaced at periodic intervals located upon impulse response 92 at a right-hand side of the line 96 are indicated in the Figure. The indicated points may be utilized to indicate the values of the impulse response at discrete points in time.

Turning now to the functional block diagram of FIG. 4, a thrity-two tap finite impulse response (FIR) filter, referred to generally by reference numeral 110, is shown. Although in the preferred embodiment of the present invention, the FIR filter comprises a thirty-two tap filter, it is to be understood that FIR filters having other numbers of taps and having other impulse responses may similarly be utilized according to the teachings of the present invention.

Thirty-two tap FIR filter 110 of FIG. 4 is supplied with an input signal on line 112. The signal on line 112 is supplied, in sequence, to thirty-one delay elements, namely, delay elements 114B, 114C, 114D, 114E, . . . 114P, 114P', . . . 114A'. The signal on line 112 is applied to coefficient block 118A. Similarly, the output side of the delay element 114B is coupled to coefficient block 118B to supply the delayed signal generated by delay element 114B thereto, and the output side of the delay element 114C is coupled to coefficient block 118C to supply the delayed signal generated by delay element 114C thereto. Similarly, the output sides of the remaining delay elements 114D-114A' are coupled to corresponding coefficient blocks 118D-118A' to supply the delayed signals generated by respective ones of the delay elements 114D-114A' thereto. Coefficient blocks 118A-A' have coefficient values corresponding to values of the thirty-two points spaced at the periodic locations upon impulse response 92 of FIG. 3B. Output sides of coefficient blocks 118A-118A' are further supplied to summer 122.

Summer 122 sums the signals supplied thereto and generates an output signal indicative thereof on line 126. Because coefficient blocks 118A-118A' are of coefficient values corresponding to the thirty-two spaced-apart points located upon impulse response 92 of FIG. 3B when the input signal supplied to delay elements 114B-A' on line 112 corresponds to a differentially-encoded, bit stream, the summed, output signal generated on line 126 corresponds to an output signal generated by a filter having the filter response of FIG. 3A.

Figure 5:
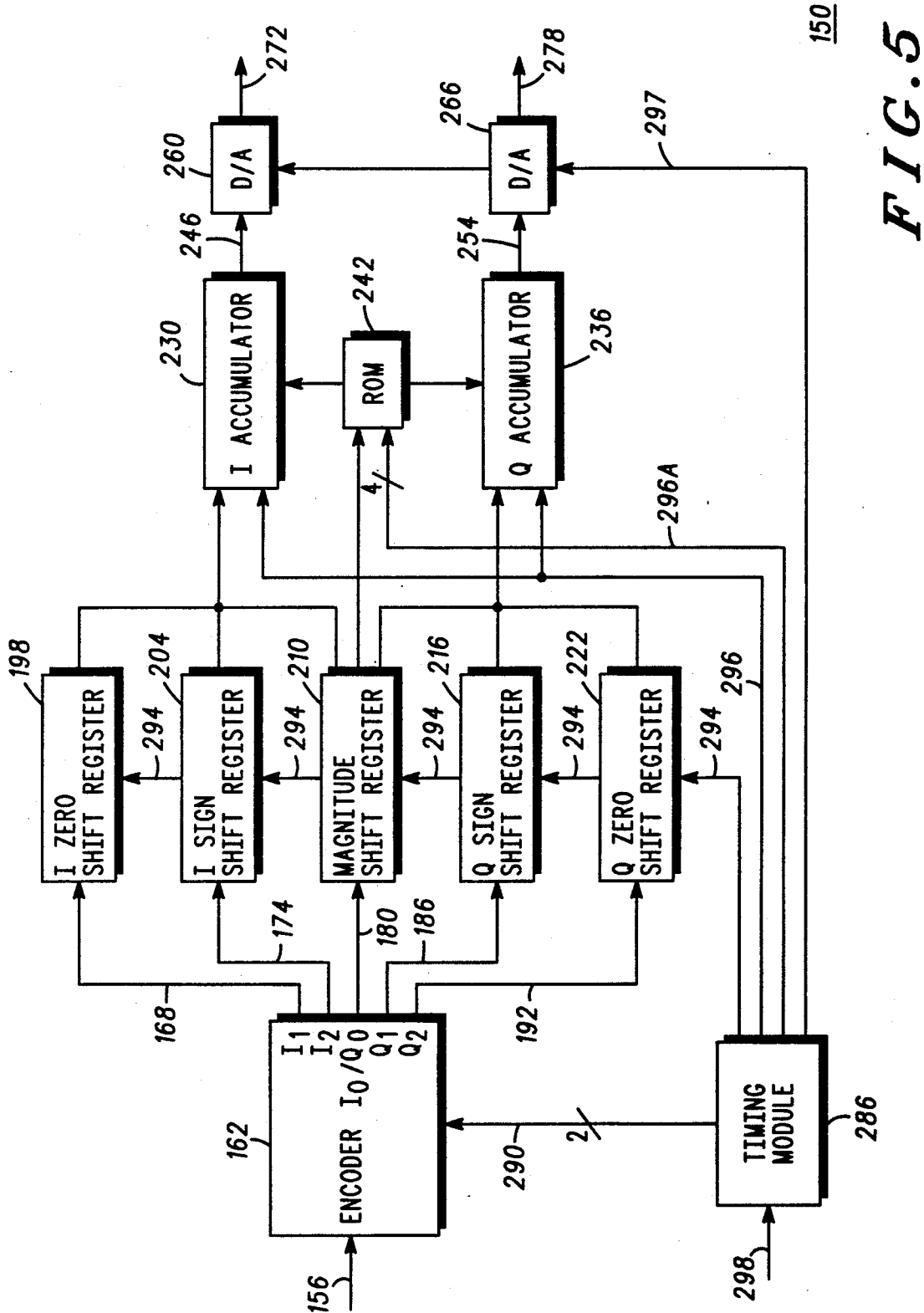
FIG. 5 is a functional block diagram of a DQPSK modulator circuit constructed according to a preferred embodiment of the present invention.

Turning now to the functional block diagram of FIG. 5, the DQPSK modulator, referred to generally by reference numeral 150, of a preferred embodiment of the present invention is shown. When supplied with an input serial bit stream, modulator 150 generates I- and Q-output signals which together form a DQPSK signal. Such an input signal is supplied on line 156 to encoder 162. As described previously with respect to the graphical representation of FIG. 2, incremental values of differentially-encoded, DQPSK signals may be of any of four possible values. Therefore, a bit stream forming differentially-encoded signals is comprised of bit pairs to indicate which of the four possible values a subsequent signal may be.

Encoder 162 functions to generate signals indicative of absolute I- and Q-component values responsive to application of the serial bit stream (comprised of differentially-encoded signal values) thereto. As previously described with respect to the graphical representation of FIG. 2, the DQPSK signal may be of eight possible values; therefore, encoder 162 generates signals on lines 168, 174, 180, 186, and 192. The signals generated on the lines 168-192 together provide an indication of absolute I- and Q-component values.

More particularly, the signal generated on line 168 indicates times when the I-portion of the DQPSK signal is of a zero value. The signal generated on line 174 indicates the polarity of the I-portion of the DQPSK signal. The signal generated on line 180 indicates magnitudes of the I- and Q-portions of the DQPSK signal. It is noted that the I-portion of the DQPSK signal may be comprised of values of 0, ±1, and ±0.707. Significantly, because the signal generated on line 168 indicates times when the I-portion of the DQPSK signal is zero, when the I-portion of the DQPSK signal is not of a zero value, the I-portion of the DQPDK signal must be comprised of a value of either ±1, or ±0.707. Additionally, because the signal generated on line 174 indicates the polarity of the I-portion of the DQPSK signal, the signal generated on line 180 need only indicate whether the I-portion of the DQPSK signal is of a magnitude of 1 or 0.707 (or, −1 or 0.707). Every possible value of which the I-portion of the DQPSK signal may be comprised is formed by proper combination of values of the signals on lines 168, 174, and 180.

The following table enumerates the possible combinations of the I- and Q-portions of the DQPSK signal.

| ZERO | SIGN | MAGNITUDE | LOCATION |
|------|------|-----------|----------|
| 0 | 0 | 0 | 0 |
| 0 | 0 | 1 | 0 |
| 0 | 1 | 0 | 0 |
| 0 | 1 | 1 | 0 |
| 1 | 0 | 0 | −.707 |
| 1 | 0 | 1 | −1 |
| 1 | 1 | 0 | .707 |
| 1 | 1 | 1 | 1 |

When the I-portion of the DQPSK signal is of a magnitude of 1 the magnitude of the corresponding, Q-portion of the DQPSK signal must be of a magnitude of zero. When, conversely, the I-portion of the DQPSK signal is of a magnitude of zero, the corresponding, Q-portion of the DQPSK signal must be of a magnitude of 1. Additionally, when the I-portion of the DQPSK signal is of a magnitude of 0.707, the corresponding Q-portion of the DQPSK signal is also of a magnitude of 0.707. Therefore, the magnitude of a single bit generated upon line 180 may be utilized to indicate the magnitudes of both the I- and the Q-portion of the DQPSK signal. Additionally, the signal generated on line 186 is (similar to the signal generated on line 174) indicative of the polarity of the Q-portion of the DQPSK signal. The signal generated on line 192 (similar to the signal generated on line 168) indicates times when the Q-portion of the DQPSK signal is of a value of zero. Hence, when encoder 162 is supplied with a serial bit stream comprised of bit pairs, a five-bit word generated by encoder 162 in a parallel format on lines 168-192 defines an absolute, DQPSK signal point.

Lines 168, 174, 180, 186, and 192 are coupled to shift registers 198, 204, 210, 216, and 222, respectively. Shift registers 198-222, in the preferred embodiment of the present invention, are comprised of discrete, eight-bit shift registers; other combinations and constructions of shift registers are, of course, possible. When shift registers 198-222 are comprised of eight-bit shift registers, shift registers 198-222 function to store, sequentially, eight different DQPSK signals therein. The signals stored in shift registers 198, 204, and 210 may be supplied to accumulator 230. Similarly, the signal stored in shift registers 216, 222, and 210 are supplied to accumulator 236.

According to a preferred embodiment of the present invention, the signals stored in shift register 210 are also sequentially supplied to a memory element, such as read only memory 242. The memory locations of memory 242 contain values representative of the possible magnitudes of the I-portion, and the Q-portion of the DQPSK signal multiplied by possible values of a filter impulse response function, such as the thirty-two points located upon the filter response 92 of FIG. 3B.

The I-portion and the Q-portion of a DQPSK signal may each be comprised of only three possible magnitudes at any point in time—0, 1, or 0.707. The product of a zero value and any other value is zero, so memory 242 need only contain products of values of one multiplied by possible values of a filter impulse response function, and products of values of 0.707 multiplied by possible values of a filter impulse response function.

When, as illustrated in FIG. 3B, the values of impulse response 92 are taken at sixteen locations at a left-hand side of symmetry line 96, two times sixteen, or thirty-two, values are stored in memory 242.

Accumulator 230 is supplied with the pre-multiplied values stored in memory 242, and an associated polarity indication generated on line 174 by encoder 162 and contained in register 204 to associate a polarity with the pre-multiplied values stored in memory. Accumulator 230 is also supplied with an indication generated on line 168 by encoder 162 and stored in shift register 198 of times when the I-portion of the DQPSK signal is of a value of zero.

Similarly, accumulator 236 is supplied with the pre-multiplied values stored in memory 242, and an associated polarity indicated generated on line 186 encoder 162 and contained in a register 216 to associate a polarity with the pre-multiplied values stored in memory. Accumulator 236 is also supplied with an indication generated on line 192 by encoder 162 and stored in shift 222 register indicative of times when the Q-portion of the DQPSK signal is of a value of zero.

Accumulators 230 and 236 each function to sum values of sequential DQPSK I- and Q-portions, respectively of the DQPSK signal in a manner similar to the summation process performed by summer 122 of FIR filter 110 of FIG. 4. A signal generated on line 246 by accumulator 230, and a signal generated on line 254 by accumulator 236 are each representative of an output signal generated by a FIR filter in a manner analogous to the signal generated on line 126 of filter 110 of FIG. 4. The signals generated on lines 246 and 254, respectively, are supplied to digital-to-analog converters 260 and 266 which generate output signals on lines 272 and 278, respectively, in analog form representative of the values of the signals supplied thereto on lines 246 and 254, respectively. The signals generated on lines 272 and 278 are analog signals of the values corresponding to the I- and Q-portions of a DQPSK signal.

Shift registers 198-222 are comprised of eight-bit shift registers according to a preferred embodiment of the present invention. The serial bit stream supplied to encoder 162 produces an output on lines 168, 174, 180, 186, and 192 which are effectively interspersed with zero values. Such a process, referred to as "zero-stuffing", intersperses the input values to the FIR filter with values comprised of zero in a ratio of three values of zero to one value of differential phase changes (i.e., a ratio of 3:1). Because of this zero-stuffing, the contents of the eight-bit shift registers 198-222, at any point in time, may be utilized to indicate an output of a filter having an impulse response similar to impulse response 92 of FIG. 3B. More particularly, because the impulse response 92 may be represented by sampling of thirty-two points, as indicated in FIG. 3B, and because three out of four values are zero, only one quarter of thirty-two points, i.e., eight points, are required to form a filter output.

The block diagram of FIG. 5 further illustrates timing module 286 coupled to supply timing to: encoder 162 on line 290, shift registers 198-222 on line 294, accumulators 230-236 on line 296, memory 242 on bus 296A, and D/A converters 260 and 266 on line 297. The timing signals maintain synchronization between the discrete elements. As illustrated, timing module 286 may receive a clock input signal on line 298. Timing module 286 preferably generates timing signals on lines 294 and 296 to operate, i.e., "clock", shift registers 198-222 at the symbol rate and accumulators 230 and 236 at thirty-two times the symbol rate of the serial bit stream supplied on line 156. (Acccumulators 230 and 236 are clocked at thirty-two times the symbol rate because the accumulators must perform eight operations for every output, and at four output samples per symbol, i.e., at a 4× oversampling rate.) By clocking accumulators 230 and 236 at such a rate, four sets of eight accumulator operations may be performed upon each symbol (i.e., bit pair) supplied on line 156. For instance, the bit stream may be of a frequency of 48.6 kHz, such that the bit pairs are supplied at a rate of 24.3 kHz. At an oversampling rate of 4×, the output sample rate is 97.2 kHz. Signals generated by timing module 286 on line 294 and supplied to shift registers 198-222 are of frequencies of 24.3 kHz (i.e., the symbol rate). Signals generated by timing module 286 on line 296 and bus 296A and supplied to accumulators 230 and 236, and to memory 242, respectively, are of frequencies of 777.6 kHz (i.e., 32× the symbol rate). Signals generated by timing module 286 on line 297 and supplied to D/A converters 260 and 266 are of frequencies of 97.2 kHz.

Figure 6:
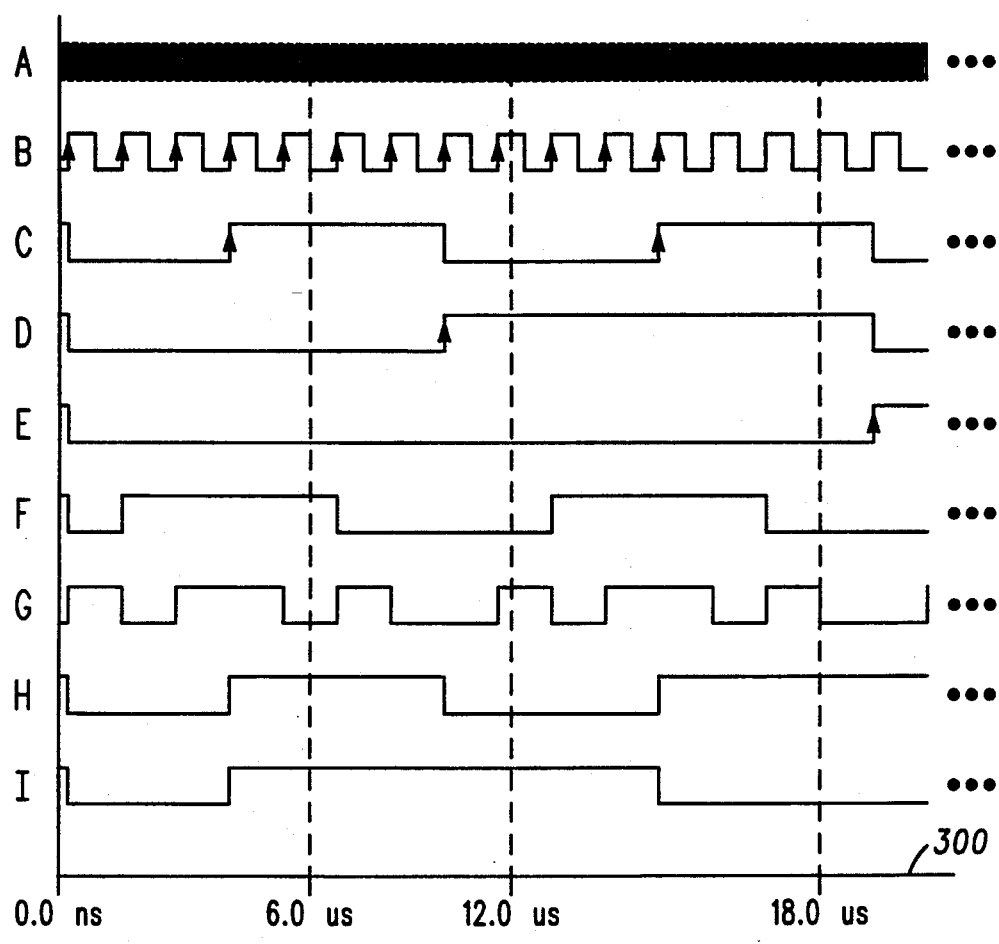
FIG. 6 is a timing diagram illustrating clocking relationships between component portions of the circuit of FIG. 5 in a preferred embodiment of the present invention.

The timing diagram of FIG. 6 illustrates graphically the clocking relationships between component portions of modulator 150 of FIG. 5. The abscissa axis 300 of timing diagram is scaled in terms of time, here in microseconds. The waveform illustrated at the top portion of the diagram, and indicated as waveform A, represents the clock input signal which is supplied to timing module 286 of FIG. 5 on lines 298. As the clock input signal is typically generated by an oscillator, and is of a high frequency, such as 9.72 MHz or higher, waveform A is represented schematically, and not to scale.

Illustrated directly beneath waveform A, and indicated as waveform B, is a clock signal of a frequency of 777.6 kHz. Waveform B is generated by timing module 286 of FIG. 5 on line 296 which is supplied to accumulators 230 and 236. Accumulators 230 and 236 are "clocked" on the rising edge of the pulses of waveform B and are operative to receive a product formed of a tap coefficient and an I- or Q-product and are operative to perform an addition or a subtraction operation with each pulse. It is additionally noted that modulator 150 of FIG. 5 further includes five multiplexers, although not illustrated in the FIGURE, which are coupled to shift registers 198-222 to receive signals indicative of the contents of the respective shift registers. These multiplexers are also clocked with the clock signal of waveform B, and outputs of the multiplexers are coupled to the accumulators 230 and 236 and memory 242 to be, thereby, the conduit through which the contents of the respective shift registers 198-222 are supplied to the accumulators 230 and 236 and memory 242.

Waveform C, illustrated in the timing diagram of FIG. 6 directly beneath waveform B, is a clock signal of a frequency of 97.2 kHz. Waveform C is generated by timing module 286 of FIG. 5 on line 297 which is supplied to D/A converters 260 and 266. D/A converters 260 and 266 are operative to latch in the sum of eight accumulates of accumulators 230 and 236, respectively (as the accumulators are clocked by waveform B, which is eight times the frequency as that of waveform C), perform the digital-to-analog conversions, and generated analog, output signals on lines 272 and 278, respectively.

Waveform D, illustrated in the timing diagram of FIG. 6 directly beneath waveform C, is a clock signal of a frequency of 48.6 kHz. Waveform D is generated by timimg module 286 of FIG. 5 on line 290 which is supplied to encoder 162. With each pulse of waveform C, another bit (supplied on line 156) is shifted into the encoder.

Waveform E, illustrated in timing diagram of FIG. 6 directly beneath waveform D, is a clock signal of a frequency of 24.3 kHz. With every pulse of waveform E, another symbol (two bits) is encoded from a DQPSK phase shift to a five-bit, encoded word. Also, the five bits are each shifted into shift registers 198-222 at a rate of 24.3 kHz.

Waveforms F, G, H, and I illustrated at the bottom portion of the timing diagram are signals generated by timing module 286 of FIG. 6 on four-line bus 296A which is supplied to memory 242. Waveforms F-I together form four-bit words which change at a frequency of 777.6 kHz in a sequence of values of: 0, 4, 8, 12, 15, 11, 7, 3, 1, 5, 9, 13, 14, 10, 6, 2, 2, 6, 10, 14, 13, 9, 5, 1, 3, 7, 11, 15, 12, 8, 4, 0 . . . The sequence of values corresponds to the sampling, in sequence, of every fourth location (tap) of a thirty-two tap FIR filter, such as that shown in FIG. 4. As The impulse response of the filter of the present invention is symmetric about an axis (such as axis 96 of FIG. 3B), only sixteen separate locations need to be considered. E.g., the contents of location (tap) 16 would be the same as location 15, the contents of location (tap) 20 would be the same as the contents of location (tap) 11, etc. The value of the four-bit words supplied on bus 296A are used, in conjunction with a signal supplied to memory 242 by shift register 210, to address a specific location of memory 242 to supply accumulators 230 and 236 with the contents of the desired memory location.

Figure 7:
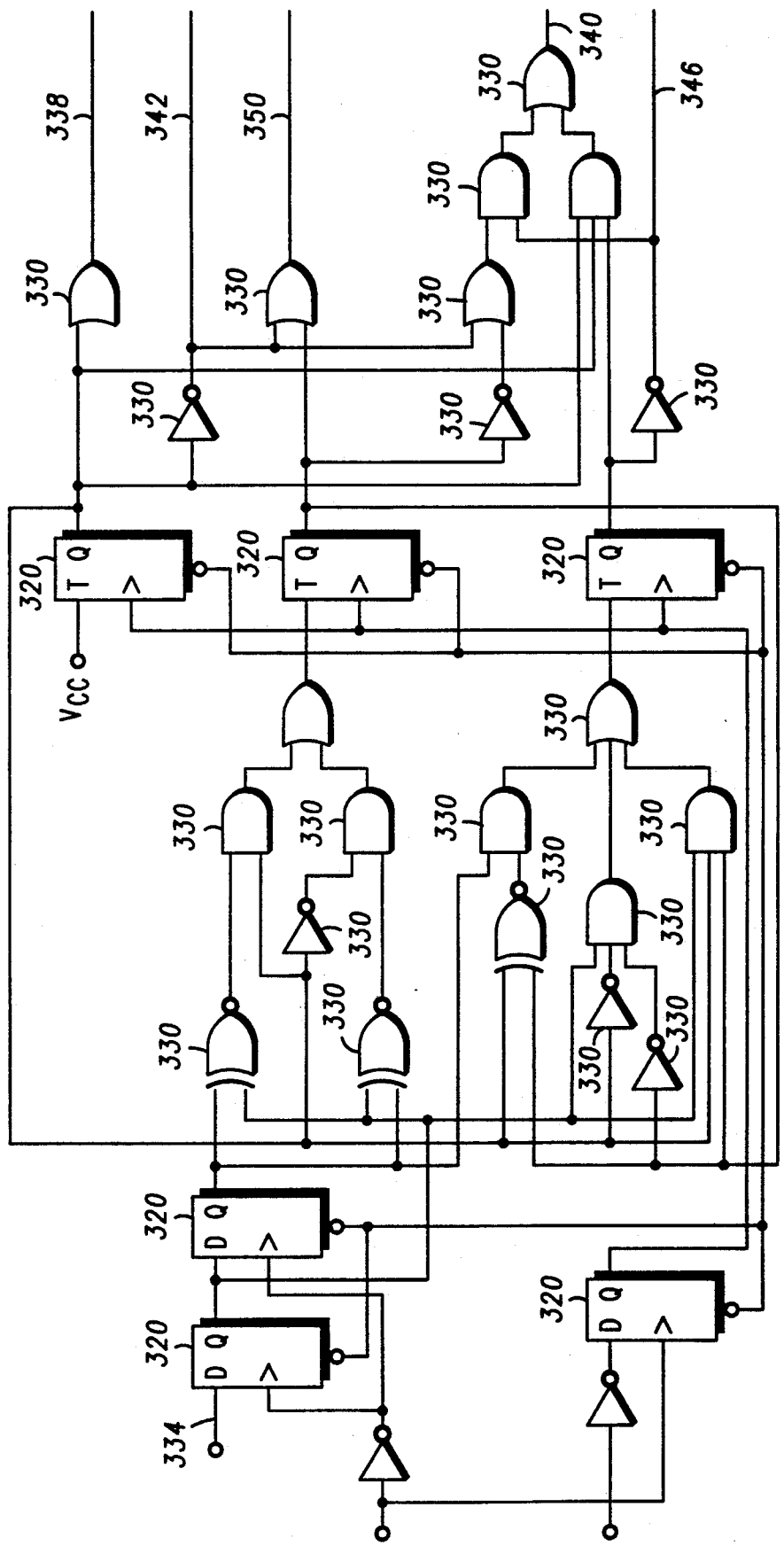
FIG. 7 is a circuit diagram of a preferred implementation of the encoder forming a portion of the DQPSK modulator of FIG. 5.

The logical, circuit schematic of FIG. 7 illustrates one hardware implementation of encoder 162 of FIG. 5. Encoder 162 is operative to perform the encoding described in United States Digital Cellular Specification IS-54, section 2.1.3.3.1. As illustrated, the hardware implementation of encoder 162 is comprised of a plurality of flip-flops 320 and a plurality of logical gates 330 suitably interconnected as shown to convert a serial, binary data stream supplied on line 334 into five-bit output signal generated on lines 338, 340, 342, 346, and 350. The signals generated on lines 338, 340, 342, 346, and 350 correspond to the signals generated on lines 168, 174, 180, 186, and 192, respectively. Other hardware constructions of encoder 162 are, of course, possible, as are software implementations thereof.

Turning now to the functional block diagram of FIG. 8, a DQPSK modulator, referred to generally by reference numeral 360, of an alternate preferred embodiment of the present invention is shown. Similar to DQPSK modulator 150 of FIG. 5, modulator 360 generates I- and Q-output signals which together form a DQPSK signal. An input serial bit stream is supplied on line 362 to encoder 364. As described previously with respect to the graphical representation of FIG. 2, incremental values of differentially-encoded, DQPSK signals may be of any of four possible values. Therefore, a bit stream forming differentially-encoded signals is comprised of bit pairs to indicate which of the four possible values a subsequent signal may be.

Encoder 364 is operative to generate signals indicative of an absolute data point responsive to application of the differentially-encoded signals comprised of the bit pairs supplied thereto on line 362. According to the encoding scheme graphically represented in FIG. 2, the absolute data point may be comprised of eight possible values. Three-bit words are required to indicate which of the eight possible values that the absolute data point is comprised.

The DQPSK modulator of FIG. 8 advantageously utilizes an aspect of the DQPSK encoding scheme to reduce the ciruitry required to form the DQPSK-modulated signal. With reference to FIG. 2, it is noted that, according to a $\pm\pi/4$ radian and $\pm 3\pi/4$ radian encoding scheme, of any two consecutive absolute data points, one will be located on one of the axes 40 or 44, and a second absolute data point will be located off of the axes 40 and 44. For instance, if a first absolute data point is that indicated by point 48, the next data point must be that indicated by points 50 or 62 ($\pm\pi/4$ radians) or 54 or 58 ($\pm 3\pi/4$ radians).

Therefore, one of the three bits of a three-bit codeword will alternate in value with each change in value of the absolute data point. Such periodic alternation is identical to the periodic alternation in value of a signal generated by a clock, such as timing module 366 which is represented by the column entitled magnitude of the table listed hereinabove. Substitution of an output signal generated by timing module 366 reduces by one the output lines required of encoder 364, and similarly, reduces the number of shift registers required to store values indicative of the absolute data point. (Because the signal generated by a clock is periodic, no storage of the value of the clock signal is necessary, as the periodic signal may be readily replicated.)

Encoder 364 generates a two-bit output signal of lines 368 and 370. Lines 368 and 370 are coupled to shift registers 372 and 374, which are preferably, similar to shift registers 198-222 of FIG. 5, eight-bit shift registers. It is noted that the DQPSK modulator of FIG. 8 differs from that of FIG. 5 in that only two shift registers (shift registers 372 and 374) are required to indicate an absolute data point rather than five shift registers (shift registers 198-222). The signals generated on lines 368 and 370 together with a clock signal generated by timing module 366 together provide an indication of absolute I- and Q-component values. Because the clock signals indicate whether absolute data is on or off of an axis (of the axis system of FIG. 2), only two sequences of bits need to be stored to indicate the absolute data point.

Signals stored in shift registers 372 and 374 are supplied to encoder 376 on lines 378 and 380, respectively. Encoder 376 generates encoded, output signals which are applied to I-accumulator 382 on line 384, and to Q-accumulator 386 on line 388. Accumulators 382 and 386 are operative in manners similar to accumulators 230 and 236 of FIG. 5, and are supplied with pre-multiplied values stored in memory 390 on lines 392 and 394, respectively. Similar to memory 242 of FIG. 5, memory 390 stores thirty-two pre-multiplied values therein. A clock signal generated by timing module 366 on line 367a is supplied to memory 390; similarly, a clock signal generated by timing module 366 on line 367B is supplied to accumulators 382 and 386. A specific location in memory is indexed, at least in part, by the value of the output signal generated by timing module 366. FIG. 8 further illustrates line 367C to permit a clock signal generated by timing module 366 to be supplied to D/A converters 400 and 402.

Accumulators 382 and 386 each function to sum values of sequential DQPSK I- and Q-portions, respectively, of the DQPSK signal in a manner similar to the summation process performed by summer 122 of FIR 110 of FIG. 4. A signal generated on line 396 by accumulator 382, and a signal generated on line 398 by accumulator 386 are each representative of an output signal generated by a FIR filter in a manner analogous to the signal generated on line 126 of filter 110 of FIG. 4. The signals generated on lines 396 and 398, respectively, are supplied to digital-to-analog converters 400 and 402 which generated output signals on lines 404 and 406, respectively, in analog form representative of the values of the signals supplied thereto. The signals generated on lines 404 and 406 are analog signals of the values corresponding to the I- and Q-portions of a DQPSK signal.

A clock signal generated by timing module 366 is additionally supplied to encoder 364 on line 408, shift registers 372 and 374 on line 410, and to encoder 376 on line 412. As illustrated, timing module 366 may receive a clock input signal on line 414, and the clock signal generated by timing module 366 is preferably of the same rate as that previously described with respect to DQPSK modulator 150 of FIG. 5.

Figure 9B:
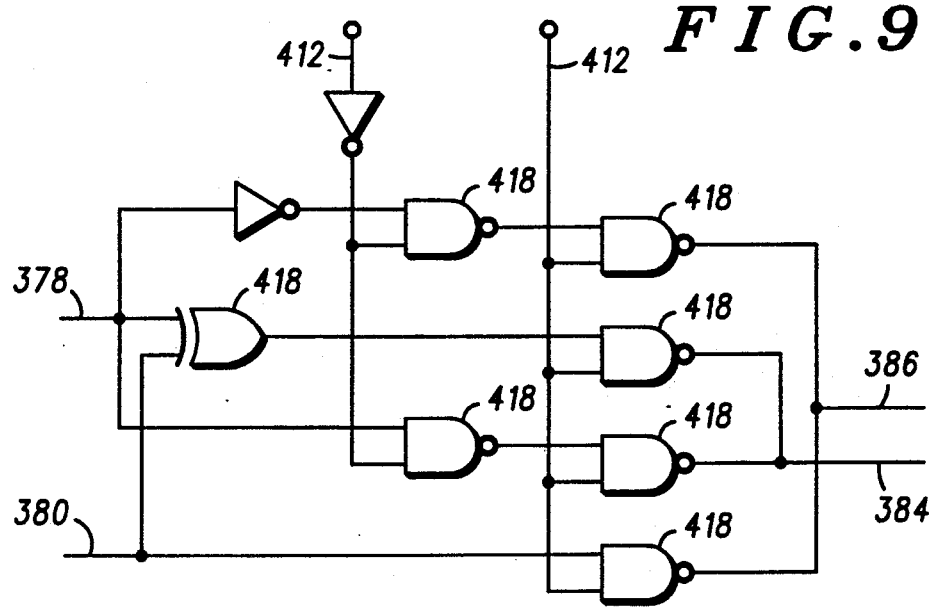

The logical, circuit schematic of FIG. 9A illustrates one hardware implementation of encoder 364 of FIG. 8, and the logical, circuit schematic of FIG. 9B illustrates one hardware implementation of encoder 376 of FIG. 8. Enocders 364 and 376 are together operative to perform the encoding described in United States Digital Cellular Specification IS-54, section 2.1.3.3.1. As illustrated the hardware implementation of encoder 364 is comprised of a plurality of flip-flops 415 and a plurality of logical gates 416 interconnected as shown. The hardware implemenntation of encoder 376 is comprised of a plurality of logical gates 418 interconnected as shown. Other hardware constructions of encoders 364 and 376 are, of course, possible, as are software implementations thereof. With respect to FIG. 9A, lines 417A and 417B correspond to lines 368 and 370 of FIG. 8. With respect to FIG. 9B, lines 378, 380, and 412, which form inputs to encoder 376, correspond to similarly numbered lines of FIG. 8.

FIG. 10 is a block diagram of a transmitter, referred to generally by reference numeral 430, of which a DQPSK modulator, similar to DQPSK modulator 150 of FIG. 5, forms a portion according to the present invention. Transmitter 430 is comprised of a transducer, such as microphone 432 for converting a voice signal into electrical form and for generating an electrical signal indicative thereof on line 434. Line 434 is coupled to speech coder 436 which converts the electrical signal supplied thereto into a digital bit stream. Speech coder 436 may, for example, be comprised of an algorithm embodied in a processor, and the algorithm may be an algorithm similar to that defined in United States Digital Cellular Specification IS-54.

Speech coder 436 generates the digital bit stream on line 438 which is coupled to channel modem 440. Channel modem 440 further receives digital input signals, such as data signals, represented by line 442. Modem 440 is operative to "pack" the bits of the bit stream generated on line 438 and the digital signal supplied thereto on line 442 in a desired sequence. Modem 440 generates a signal on line 444 which is supplied to encoder 448. Encoder 448 corresponds to encoder 162 of FIG. 5, and the circuit implementation thereof shown in FIG. 7. Encoder 448 generates encoded signals on lines 454 and 460. Line 454 of tramsmitter 430 of FIG. 9 corresponds with lines 168, 174, and 180 of modulator 150 of FIG. 5, and line 460 of transmitter 430 of FIG. 10 corresponds with lines 180, 186, and 192 of modulator 150 of FIG. 5.

Line 454 is coupled to FIR filter 466, and line 460 is coupled to FIR filter 472. Filter 466 corresponds to accumulator 230, memory 242, and shift registers 198-210 of FIG. 5, and filter 472 corresponds to accumulator 236, memory 242, and shift registers 210-222 of FIG. 5.

Filter 466 generates a signal on line 478 having values corresponding to the value of an I-portion of a DQPSK signal, and filter 472 generates a signal on line 484 representative of a Q-portion of a DSPSK signal. Lines 478 and 482 are coupled to filter circuits 490 and 496, respectively which generated filtered signals on lines 502 and 508 which are supplied to quadrature modulator 516. Quadrature modulator 516 is operative to modulate the I- and Q-portions of the DSPSK to generate a DQPSK-modulated signal on line 522. Line 522 may be coupled to antenna 528 to permit transmission of the DQPSK-modulated signal upon a radio-frequency channel thereby.

Figure 11:
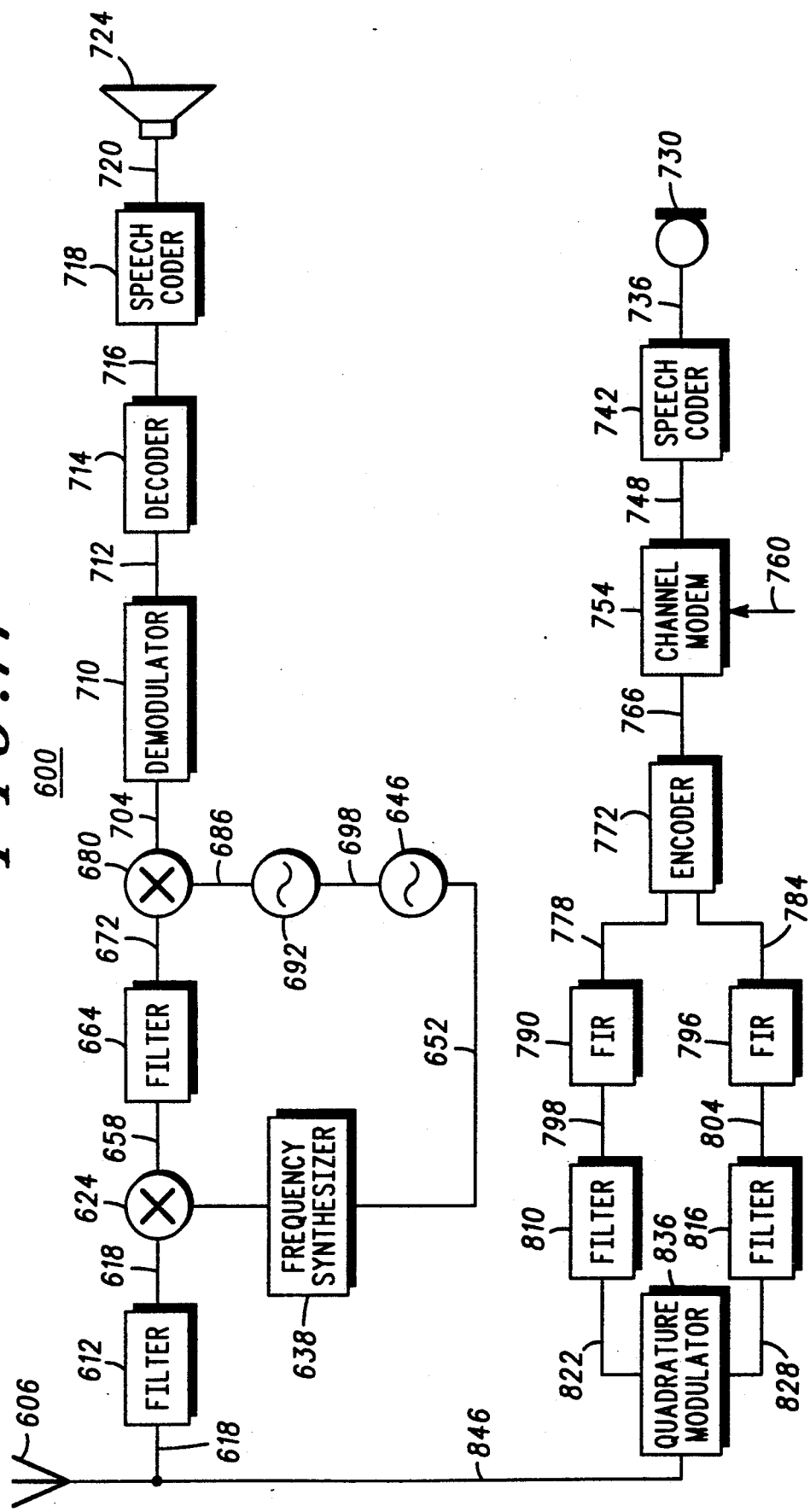
FIG. 11 is a functional block diagram of a radiotelephone constructed according to the teachings of the present invention of which the DQPSK modulator of FIG. 5 forms a portion thereof.

FIG. 11 is a block diagram of a transceiver constructed according to the present invention which includes a DQPSK modulator similar to modulator 150 of FIG. 5. Transceiver 600 may, for example, comprise a radiotelephone utilized in a cellular, communication system. A signal transmitted upon a radio frequency channel is received by antenna 606, which, subsequent to reception, is supplied to filter 612 on line 618. Filter 612 filters the received signal and generates a filtered signal on line 618.

Line 618 is coupled to mixer 624 which also receives an oscillating signal on line 630 formed by frequency synthesizer 638 responsive to the oscillating frequency of reference oscillator 646, the oscillating signal generated thereat being connected to synthesizer 638 on line 652. Mixer 624 converts downward in frequency the signal supplied thereto on line 618, and generates a down-converted signal on line 658 which is supplied to filter 664. Filter 664 generates a filtered signal on line 672 which is supplied to second mixer 680.

Mixer 680 additionally receives an oscillating input on line 686 supplied by oscillator 692. The oscillating frequency of oscillator 692 is controlled by the oscillating frequency of reference oscillator 646 and is coupled to oscillator 646 on line 698. Mixer 680 generates a second, down-converted signal on line 704 which is supplied to the demodulator circuit 710. The demodulator circuit 710 generates a demodulated signal on line 712 which a supplied to decoder 714. Decoder 714 generates a signal on line 716 which is supplied to speech coder 718, and speech coder 718 generates a signal on line 720 which is supplied to a transducer, such as speaker 724. Speaker 724 converts the signal supplied thereto into an audible signal.

A transmit portion of transmitter 600 is similar to that of transmitter 430 of FIG. 10 and includes a transducer such as microphone 730 which converts a voice signal into electrical form and generates a signal indicative thereof on line 736. Line 736 is coupled to speech coder 742 which converts the electrical signal supplied thereto into a binary data stream. Speech coder 742 generates a binary data stream upon line 748 which is supplied to channel modem 754.

Channel modem 754 also receives digital signals on line 760 and combines the digital signals supplied thereto on lines 748 and 760 in a desired sequence and generates a digital signal on line 766. Line 766 is coupled to encoder 772 which converts the data stream supplied thereto into I- and Q-portions and generates signals indicative of such on lines 778 and 784, respectively, to FIR filters 790 and 796. Filter 790 generates a signal on line 798, and filter 796 generates a signal on line 804 which are supplied to filters 810 and 816, respectively. Filter 810 generates a filtered signal on line 822, and filter 816 generates a filtered signal on line 828, and the filtered signals generated thereon are supplied to quadrature modulator 836. Quadrature modulator 836 generates a DQPSK-modulated signal on line 846 which is supplied to antenna 606 to permit transmission of the DQPSK-modulated signal therefrom.

Figure 12:
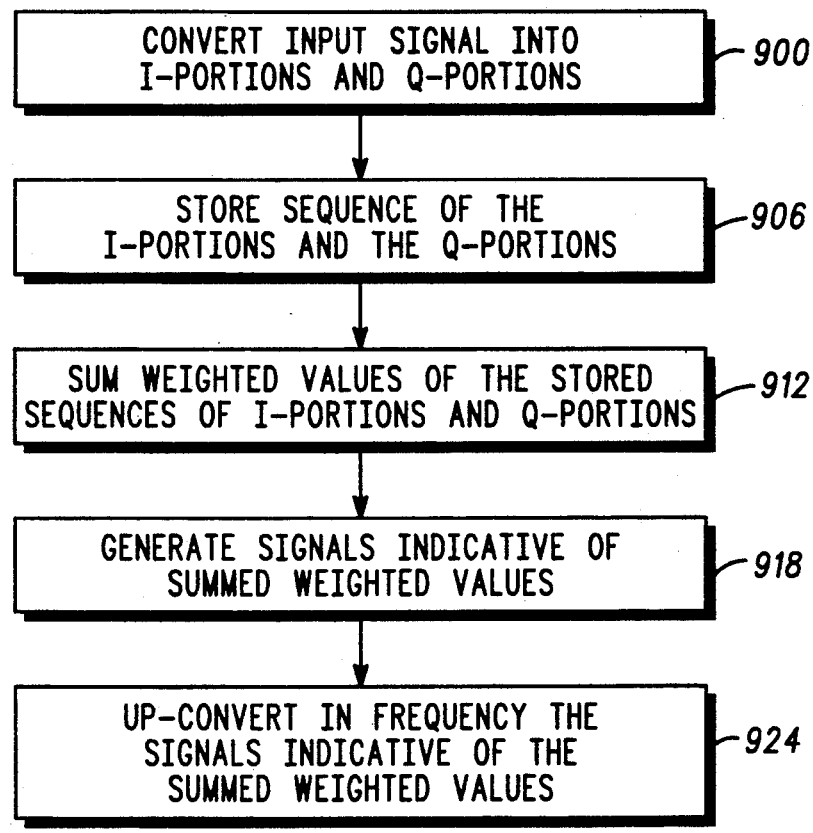
FIG. 12 is a logical flow diagram illustrating the steps of the method of the present invention.

Turning now to the logical flow diagram of FIG. 12, the method steps of the method of the present invention are shown. First, and as indicated by block 900, an input signal representative of differential signal phase changes are converted into signals having I-component portions and Q-component portions. Next, and as indicated by block 906, sequences of the I-component portions and the Q-component portions of the signals are stored. Next, and as indicated by block 912, weighted values of the stored sequences of the I-component portions and the Q-component portions of the input signal are summed to form thereby summed, weighted values. Next, and as indicated by block 918, signals indicative of the summed, weighted values are generated. Finally, and as indicated by block 924, the signals indicative of the summed, weighted values are up-converted in frequency to form a modulated, DQPSK signal thereby.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A modulator circuit for generating a modulated, DQPSK signal of a desired bandwidth responsive to application of an input signal representative of differential signal phase changes, said modulator circuit comprising:

an encoder for converting the input signal representative of the differential signal phase changes into an encoded signal representative of a signal formed of an I-component portion and a Q-component portion;

means for storing sequences of the encoded signal representative of the signal formed of the I-component portion and the Q-component portion generated by said encoder;

a memory element for storing values corresponding to possible values of an I-component portion and a Q-component portion, respectively, of an input signal multiplied by values of an impulse response of a filter, each value stored therein forming a weighted value thereby;

means for summing weighted values stored in the memory element corresponding to sequences of the encoded signal stored by said means for storing and for forming summed, weighted values indicative of summations thereof; and means for generating signals indicative of the summed, weighted values formed by the means for summing, said signals formed thereby forming the modulated, DQPSK signal of the desired bandwidth.

2. The modulator circuit of claim 1 wherein the encoded signal formed by said encoder comprises a first, three-bit, encoded signal wherein a first bit of the first, three-bit, encoded signal indicates times when the I-component portion of the encoded signal is of a zero value, a second bit of the three-bit, encoded signal indicates polarity of the I-component portion of the encoded signal, and a third bit of the first, three-bit, encoded signal indicates magnitudes of the I-component portion of the encoded signal.

3. The modulator circuit of claim 1 wherein the encoded signal formed by said encoder comprises a second, three-bit, encoded signal wherein a first bit of the second, three bit, encoded signal indicates times when the Q-component portion of the encoded signal is of a zero value, a second bit of the second, three-bit, encoded signal indicates polarity of the Q-component portion of the encoded signal, and a third bit of the second, three-bit, encoded signal indicates magnitudes of the Q-component portion of the encoded signal.

4. The modulator circuit of claim 1 wherein said encoder generates a five-bit, encoded signal wherein a first bit of said five-bit, encoded signal indicates times when the I-component portion of the encoded signal is of a zero value; a second bit of the five-bit encoded signal indicates polarity of the I-component portion of the encoded signal; a third bit of the five-bit, encoded signal indicates times when the Q-component portion of the encoded signal is of a zero value; a fourth bit of the five-bit, encoded signal indicates polarity of the Q-component portion of the encoded signal; and a fifth bit of the five-bit, encoded signal indicates magnitudes of the I-component portion and the Q-component portion of the encoded signal.

5. The modulator circuit of claim 4 wherein said means for storing comprises at least on shift register for storing component values of sequences of the I-component and Q-component portions, respectively, of the encoded signal.

6. The modulator circuit of claim 5 wherein said at least on shift register comprises a plurality of shift registers, each associated with a bit of the five-bit, encoded signal for storing sequences of bits of respective ones of bits of the five-bit, encoded signal therein.

7. The modulator circuit of claim 1 wherein said encoder is comprised of a first encoder portion and a second encoder portion wherein said first encoder portion generates a first, two-bit encoded signal, and said second encoder portion generates two sets of two-bit encoded signals.

8. The modulator circuit of claim 7 wherein said means for storing comprises first and second shift registers each associated with a bit of the first, two-bit encoded signal for storing sequences of bits of respective ones of bits of the first, two-bit, encoded signal therein.

9. The modulator circuit of claim 7 further comprising means for generating a clock signal wherein a clock signal generated therefrom together with the sets of two-bit encoded signals form the encoded signal generated by the encoder.

10. The modulator circuit of claim 1 wherein said means for summing comprises an in-phase accumulator for summing sequences of the I-component portions of the encoded signal.

11. The modulator circuit of claim 1 wherein said means for summing comprises a quadrature-phase accumulator for summing sequences of the O-component portions of the input signal.

12. The modulator circuit of claim 1 wherein said impulse response of the filter utilized to form the weighted value forms a sinc function.

13. The modulator circuit of claim 1 wherein said filter of which the impulse response thereof is utilized to form the weighted value comprises a square-root, raised cosine, low pass filter.

14. The modulator circuit of claim 1 wherein said possible values of the I-component portion and the Q-component portion, respectively, of the input signal comprises normalized values of "1" and "0.707".

15. The modulator circuit of claim 1 wherein said values of the impulse response function comprise values corresponding to sixteen points taken across a plot of the impulse response of the filter.

16. The modulator circuit of claim 1 wherein said means for generating comprises means forming a digital to analog converter for receiving the summed, weighted values formed by said means for summing and for generating analog signals indicative thereof.

17. The modulator circuit of claim 1 further comprising means for up-converting the signals indicative of the summed, weighted values generated by said means for generating to a transmission frequency to form a radio frequency, DQPSK-modulated signal thereby.

18. The modulator circuit of claim 17 wherein said means for up-converting comprises a quadrature modulator.

19. A circuit for generating a filtered, DQPSK signal responsive to application thereto of an input signal representative of differential signal phase changes having an I-component portion and a Q-component portion, said circuit comprising:

at least one shift register for storing component values indicative of magnitudes of component portions of sequences of the input signal;

means for summing weighted values of the stored component values indicative of the magnitudes of component portions of sequences of the input signal and for forming summed, weighted values therefrom; and means for generating signals indicative of the summed, weighted values generated by the means for summing.

20. The circuit of claim 19 wherein a shift register of said at least one shift register stores component values to indicate times when the I-component portion of the input signal is of a zero value.

21. The circuit of claim 19 wherein a shift register of said at least one shift register stores component values indicative of an I-component portion polarity of the I-component portion of the input signal.

22. The circuit of claim 19 wherein a shift register of said at least one shift register stores component values to indicate times when the Q-component portion of the input signal is of a zero value.

23. The circuit of claim 19 wherein a shift register of said at least one shift register stores component values indicative of a Q-component portion polarity of the Q-component portion of the input signal.

24. The circuit of claim 19 wherein said means for summing comprises an in-phase accumulator for summing sequences of the I-component portion values of the input signal.

25. The circuit of claim 19 wherein said means for summing comprises a quadrature-phase accumulator for summing sequences of the Q-component portion values of the input signal.

26. The circuit of claim 19 further comprising means for forming the weighted values summed by said means for summing.

27. The circuit of claim 26 wherein said means for forming the weighted values comprises a memory element for storing values corresponding to possible values of the I-component portion and the Q-component portion, respectively, of the input signal multiplied by values of a filter impulse response function.

28. The circuit of claim 27 wherein said filter impulse response function forms a sinc function.

29. The circuit of claim 27 wherein possible values of the I-component portion and the Q-component portion, respectively, of the input signal comprises normalized values of "1" and "0.707".

30. The circuit of claim 27 wherein said values of the filter impulse response function comprises values corresponding to sixteen points taken across the filter impulse response function.

31. The circuit of claim 19 wherein said means for generating comprises means forming a digital to analog converter for receiving the summed, weighted values formed by said means for summing and for generating analog signals indicative thereof.

32. A transmitter circuit for generating a radio frequency, DQPSK-modulated signal responsive to application of an input signal representative of differential signal phase changes, said transmitter circuit comprising:

an encoder for generating an encoded signal representative of an I-component portion and a Q-component portion of the input signal, said encoded signal generated thereby comprised of at least five bits wherein a first bit of the at least five bits indicates times when the I-component portion of the input signal is of a zero value; a second bit of the at least five bits indicates polarity of the I-component portion of the input signal; a third bit of the at least five bits indicates times when the Q-component portion of the input signal is of a zero value; a fourth bit of the at least five bits indicates polarity of the Q-component portion of the input signal; and a fifth bit of the at least five bits indicates magnitudes of the I-component portion and the Q-component portion of the input signal;

a plurality of shift registers, each associated with a bit of the at least five bits of the encoded signal for storing sequences of bits of respective ones of bits of the at least five bits therein;

a memory element for storing values corresponding to possible values of the I-component portion and the Q-component portion, respectively, of the input signal multiplied by values of a filter impulse response function;

an in-phase accumulator coupled to receive sequences of portions of said encoded signal generated by the encoder and sequences of values stored in the memory element, each of the sequences received by the in-phase accumulator, respectively, corresponding to values of the I-component portion of the encoded signal generated by the encoder, said in-phase accumulator for summing sequences of the I-component portion of the encoded signal and for forming in-phase, summed signals indicative thereof;

a quadrature phase accumulator coupled to receive sequences of portions of said encoded signal generated by the encoder and sequences of values stored in the memory element, each of said sequences received by the quadrature-phase accumulator, respectively, corresponding to values of the Q-component portion of the encoded signal generated by the encoder, said quadrature-phase accumulator for summing sequences of the Q-component portion of the encoded signal and for forming quadrature-phase, summed signals indicative thereof;

at least one digital-to-analog converter for receiving the in-phase, summed signals and the quadrature-phase, summed signals formed by the in-phase accumulator and the quadrature-phase accumulator, respectively, and for generating analog, in-phase, summed signals and analog, quadrature-phase, summed signals therefrom; and a quadrature modulator for up-converting said analog, in phase, summed signals and said analog, quadrature-phase summed signals generated by the at least one digital to analog converter to a transmission frequency to form a radio frequency DQPSK-modulated signal thereby.

33. A method for generating a modulated, DQPSK signal, said method comprising the steps of:

converting an input signal representative of differential signal phase changes into an encoded signal representative of a signal formed of an I-component portion and a Q-component portion;

storing sequences of the encoded signal representative of the signal formed of the I-component portion and the Q-component portion of the signals generated during said step of converting;

storing values in a memory element corresponding to possible values of an I-component portion and a Q-component portion, respectively, of an input signal multiplied by values of an impulse response of a filter, each product derived thereby forming a weighted value;

summing weighted values stored in the memory element corresponding to sequences of the encoded signal formed during said step of storing sequences of the encoded signal and for forming summed, weighted values thereby; and generating signals indicative of the summed weighted values which form thereby the modulated, DQPSK signal.

34. A modulator circuit for generating a modulated, DQPSK signal of a desired bandwidth responsive to application of an input signal representative of differential signal phase changes, said modulator circuit comprising:

an encoder for converting the input signal representative of the differential signal phase changes into a five-bit, encoded signal representative of a signal formed of an I-component portion and a Q-component portion wherein a first bit of said five-bit, encoded signal indicates times when the I-component portion of the encoded signal is of a zero value; a second bit of the five-bit encoded signal indicates polarity of the I-component portion of the encoded signal; a third bit of the five-bit, encoded signal indicates times when the Q-component portion of the encoded signal is of a zero value; a fourth bit of the five-bit, encoded signal indicates polarity of the Q-component portion of the encoded signal; and a fifth bit of the five-bit, encoded signal indicates magnitudes of the I-component portion and the Q-component portion of the encoded signal.

means for storing sequences of the five-bit, encoded signal representative of the signal formed of the I-component portion and the Q-component portion generated by said encoder;

a memory element for storing values corresponding to possible values of an I-component portion and a Q-component portion, respectively, of an input signal multiplied by values of an impulse response of a filter, each value stored therein forming a weighted value thereby;

means for summing weighted values stored in the memory element corresponding to sequences of the encoded signal stored by said means for storing and for forming summed, weighted values indicative of summations thereof; and means for generating signals indicative of the summed, weighted values formed by the means for summing, said signals formed thereby forming the modulated, DQPSK signal of the desired bandwidth.

35. A circuit for generating a filtered, DQPSK signal responsive to application thereto of an input signal representative of differential signal phase changes having an I-component portion and a Q-component portion, said filter comprising:

means for storing sequences of the input signal;

a memory element for storing values corresponding to possible values of an I-component portion and a Q-component portion, respectively, of an input signal multiplied by values of an impulse response of a filter, whereby each product derived thereby forms a weighted value;

means for summing weighted values stored in the memory element corresponding to sequences of the input signal stored by said means for storing and for forming summed, weighted values indicative of summations thereof; and means for generating signals indicative of the summed, weighted values generated by the means for summing.

* * * * *